US010980373B2

(12) United States Patent
Cotto

(10) Patent No.: US 10,980,373 B2
(45) Date of Patent: Apr. 20, 2021

(54) INSECT GUARD AND A COOKING UTENSIL CONTAINER WITH AN INSECT GUARD

(71) Applicant: Ivan Cotto, Copiague, NY (US)

(72) Inventor: Ivan Cotto, Copiague, NY (US)

(*) Notice: Subject to any disclaimer, the term of this patent is extended or adjusted under 35 U.S.C. 154(b) by 0 days.

(21) Appl. No.: 16/935,564

(22) Filed: Jul. 22, 2020

(65) Prior Publication Data
US 2021/0022561 A1 Jan. 28, 2021

Related U.S. Application Data

(60) Provisional application No. 62/878,022, filed on Jul. 24, 2019.

(51) Int. Cl.
A47J 47/16 (2006.01)

(52) U.S. Cl.
CPC .................. A47J 47/16 (2013.01)

(58) Field of Classification Search
CPC .......... A47L 17/00; A47L 13/02; A47L 13/04; A47L 13/06; A47L 13/51; A47L 13/512; A47L 17/06; A47L 17/10; A47L 19/00; A47L 25/00; A47J 47/16; B65D 47/2031; B65D 51/246; B44D 3/123
USPC ......... 211/41.11, 65, 66; 220/200, 229, 697, 220/735, 736; 15/104.92, 160; 206/216
See application file for complete search history.

(56) References Cited

U.S. PATENT DOCUMENTS

| 597,729 | A | * | 1/1898 | Mitchell | A63B 57/60 15/104.92 |
| 2,121,307 | A | * | 6/1938 | Swift | 15/104.001 |
| 2,175,735 | A | * | 10/1939 | Banks | B65D 51/246 401/119 |
| 2,404,507 | A | * | 7/1946 | Link | A46B 9/06 15/104.011 |
| 2,478,522 | A | * | 8/1949 | Buskirk | A61C 19/002 15/106 |
| 3,838,473 | A | * | 10/1974 | Remih | A47L 15/0068 15/105 |
| 4,069,536 | A | * | 1/1978 | Hartz | A63B 57/60 15/104.92 |
| 4,087,878 | A | * | 5/1978 | Grieshaber | A61B 90/70 15/104.92 |
| 4,439,884 | A | * | 4/1984 | Giorni | B08B 1/00 15/104.04 |
| 4,530,726 | A | * | 7/1985 | Montiel | A45D 29/007 132/73.5 |
| 4,676,839 | A | * | 6/1987 | Osborn | A63B 60/36 134/25.4 |
| 4,752,983 | A | * | 6/1988 | Grieshaber | A61B 90/70 15/160 |
| 4,776,456 | A | * | 10/1988 | Lewis | A47K 11/10 206/15.2 |

(Continued)

Primary Examiner — Jennifer E. Novosad
(74) Attorney, Agent, or Firm — Ostrolenk Faber LLP

(57) ABSTRACT

A cooking utensil storage that includes a container having a base and a wall terminating at an upper rim that defines an open mouth, and an insect guard having a support surrounding a utensil reception and extraction space, and a plurality of flexible bristles extending from the support into the utensil reception and extraction space, the bristles being arranged to create an insect barrier at the open mouth with the bristles being movable to permit at least a portion of a cooking utensil that touches the food to pass through the bristles while entering the container or being extracted from the container.

13 Claims, 5 Drawing Sheets

(56) References Cited

U.S. PATENT DOCUMENTS

| | | | | |
|---|---|---|---|---|
| 4,965,906 A * | 10/1990 | Mauro | A63B 47/04 | 15/104.92 |
| 4,995,509 A * | 2/1991 | Kornfeind | A47K 1/09 | 206/205 |
| 5,269,615 A * | 12/1993 | Lewis, Jr. | A46B 9/02 | 401/10 |
| 5,404,610 A * | 4/1995 | Coyer, Sr. | A63B 57/60 | 15/104.92 |
| 5,454,131 A * | 10/1995 | Mackenzie | A47L 25/00 | 15/104.92 |
| 5,471,706 A * | 12/1995 | Wallock | A61L 2/18 | 15/104.92 |
| 5,652,993 A * | 8/1997 | Kreyer | A46B 11/00 | 15/104.92 |
| 5,810,021 A * | 9/1998 | Walker | A45D 29/007 | 132/74.5 |
| 5,829,603 A * | 11/1998 | Martineau | A46B 17/06 | 211/66 |
| 6,086,275 A * | 7/2000 | King | A46B 11/0041 | 15/160 |
| 6,269,512 B1 * | 8/2001 | Thomson | A46B 9/02 | 15/104.92 |
| 6,430,770 B1 * | 8/2002 | Glass | A63B 57/60 | 15/104.92 |
| 6,502,711 B1 * | 1/2003 | Mc Rae | B65D 21/0204 | 211/71.01 |
| 6,745,424 B1 * | 6/2004 | Pimentel | A63B 47/04 | 15/104.92 |
| 6,983,508 B2 * | 1/2006 | Saurer | A46B 13/001 | 15/104.04 |
| 7,162,766 B1 * | 1/2007 | Yakopcic | A46B 11/001 | 15/104.92 |
| 7,302,915 B2 * | 12/2007 | Leary | A01K 13/001 | 119/664 |
| 7,971,308 B1 * | 7/2011 | Lawson | A46B 15/0055 | 15/104.92 |
| 8,403,580 B2 * | 3/2013 | De Laforcade | A45D 40/267 | 401/129 |
| 8,453,864 B2 * | 6/2013 | Krueger | A47G 19/30 | 220/229 |
| D691,772 S * | 10/2013 | Blaisdell | D32/35 | |
| 8,572,793 B1 * | 11/2013 | Huntley | B08B 1/002 | 15/104.92 |
| 8,607,396 B2 * | 12/2013 | Albright | A46B 15/0055 | 15/104.92 |
| D799,126 S * | 10/2017 | Shamoon | D30/158 | |
| 10,413,154 B2 * | 9/2019 | Stein | A46B 5/0095 | |
| 2003/0098044 A1 * | 5/2003 | Peterson | A46B 17/06 | 134/6 |
| 2003/0217423 A1 * | 11/2003 | Larsen | B08B 1/00 | 15/104.92 |
| 2005/0273957 A1 * | 12/2005 | Boltryk | A46B 9/00 | 15/104.92 |
| 2008/0257384 A1 * | 10/2008 | Farrell | B08B 3/04 | 134/6 |
| 2010/0263145 A1 * | 10/2010 | Chen | A46B 13/001 | 15/160 |
| 2011/0225834 A1 * | 9/2011 | Cirilli | A45D 27/29 | 30/541 |
| 2013/0075283 A1 * | 3/2013 | Monson | A46B 11/001 | 206/216 |
| 2014/0165920 A1 * | 6/2014 | Sarty | A01K 7/005 | 119/72 |
| 2014/0231050 A1 * | 8/2014 | Striker | A47J 36/2411 | 165/80.5 |
| 2014/0326193 A1 * | 11/2014 | Plummer | A01J 7/04 | 119/651 |
| 2018/0178956 A1 * | 6/2018 | DelRosario, II | B65D 51/246 | |
| 2018/0352796 A1 * | 12/2018 | Chattman | A01M 1/02 | |
| 2019/0216075 A1 * | 7/2019 | McGavin | A01M 1/02 | |
| 2020/0130905 A1 * | 4/2020 | Bianco | B65D 51/246 | |

* cited by examiner

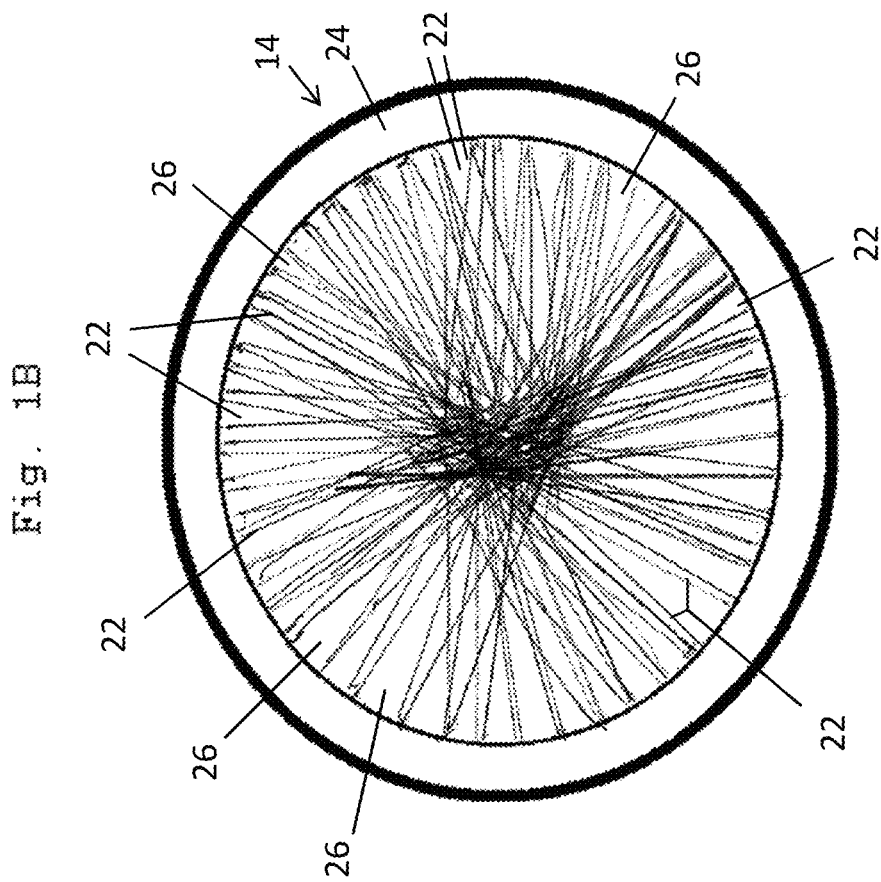
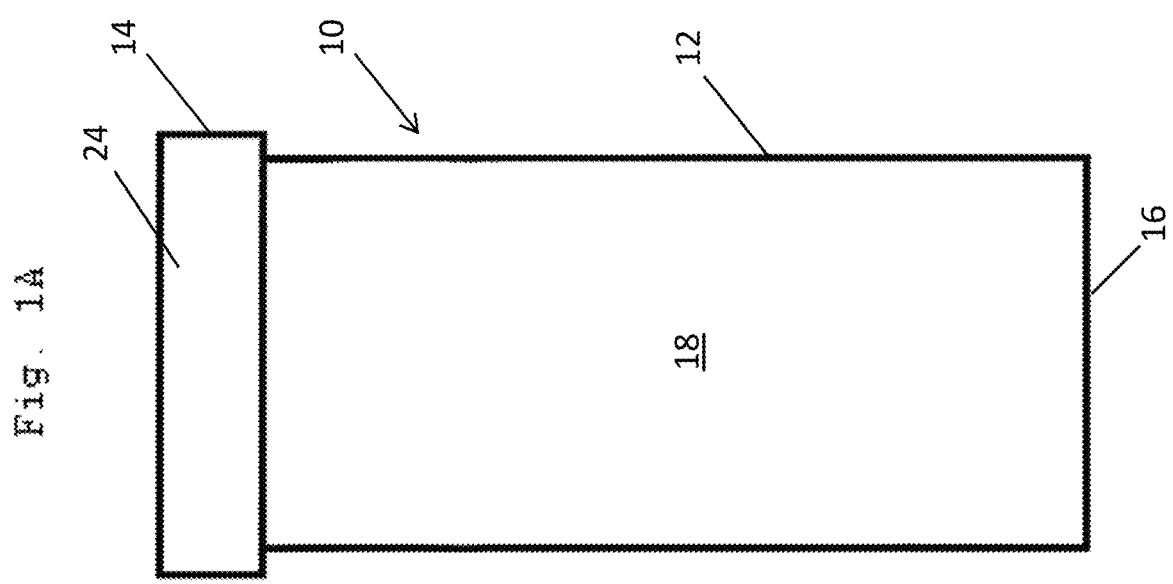

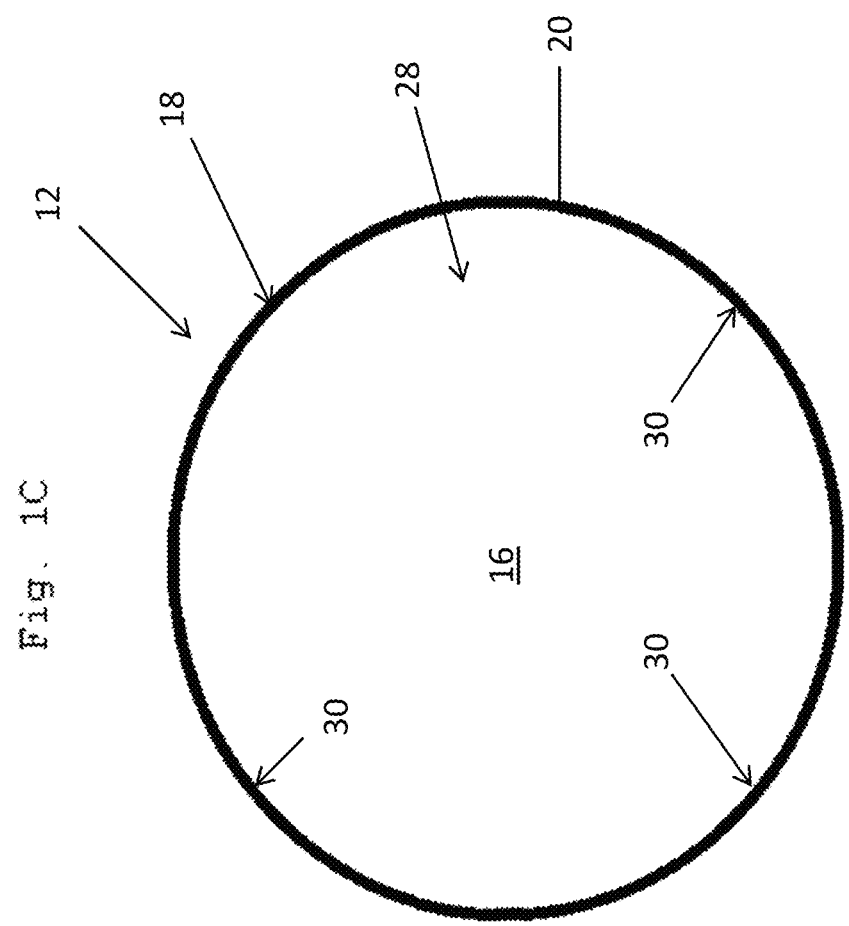

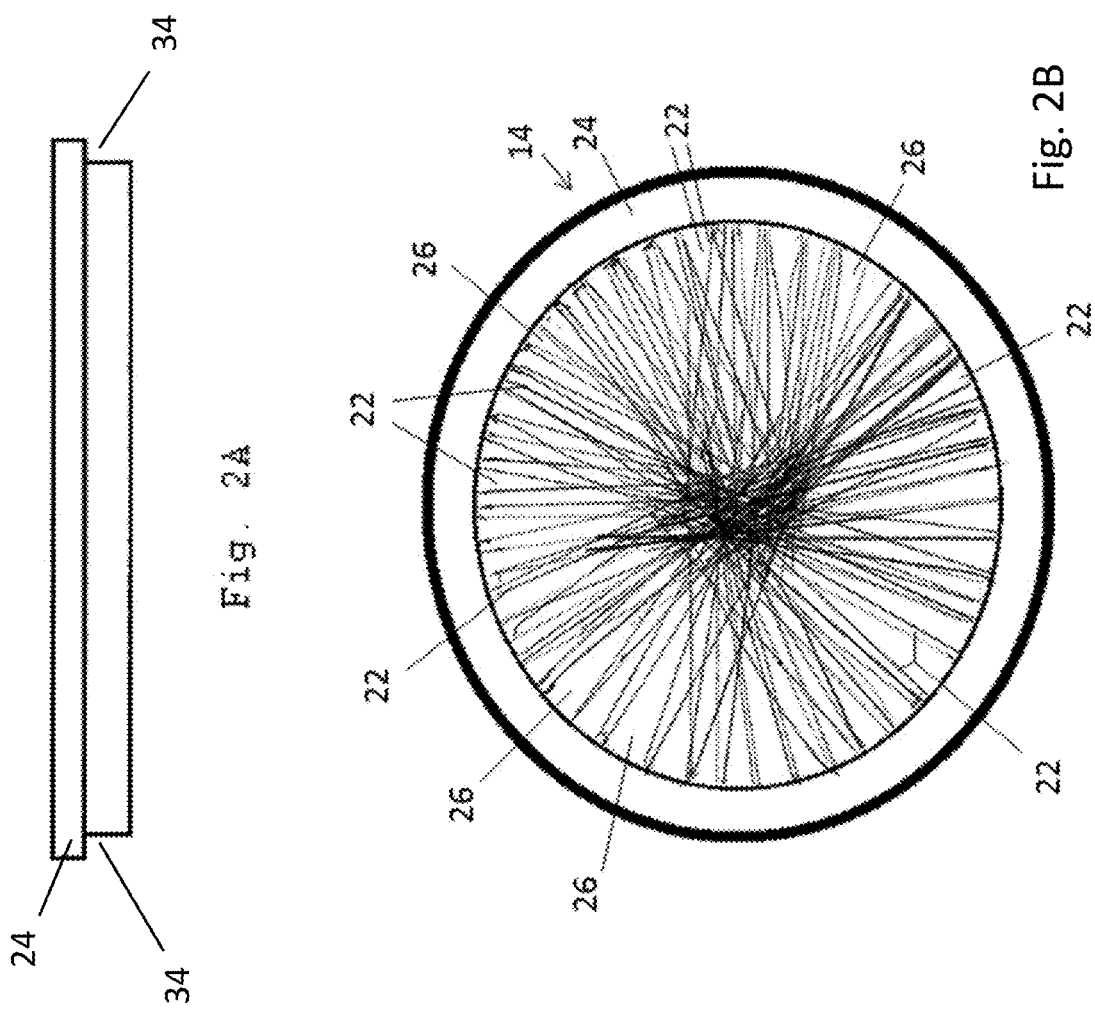

INSECT GUARD AND A COOKING UTENSIL CONTAINER WITH AN INSECT GUARD

CLAIM OF PRIORITY

The present application is a non-provisional application claiming priority to the U.S. provisional application having the Ser. No. 62/878,022, filed on Jul. 24, 2019, the entire disclosure of which is incorporated by reference.

FIELD OF INVENTION

The present invention relates to an insect guard and a cooking utensil container that includes an insect guard to keep insects such as flies from contaminating the utensils.

BACKGROUND OF THE INVENTION

Cooking, such as outdoor cooking, is a common activity. To cook outdoors, for example, utensils are used to handle the food.

When unattended, for example, flies or other insects may make contact with the cooking utensils and thereby cause contamination of the cooking utensils.

Common house flies, for example, can infect humans with more than sixty types of pathogens. Common house flies may also transfer parasites to humans.

Thus, there is a need for keeping the insects, such as flies, away from the cooking utensils while using the cooking utensils outdoors or indoors.

SUMMARY OF THE INVENTION

An objective of the present invention is a method of keeping insects away from at least the portion of a cooking utensil that touches the food.

A further objective of the present invention is an insect guard.

An additional objective of the present invention is a cooking utensil container that keeps insects such as flies from making contact with at least the portion of the utensil that touches the food.

Another object of the invention is a cooking utensil container that permits easy reception and extraction of the portion of the utensil that touches the food.

Other features and advantages of the present invention will become apparent from the following description of the invention which refers to the accompanying drawings.

BRIEF DESCRIPTION OF THE DRAWINGS

FIG. 1A shows a side view of a cooking utensil container according to the first embodiment of the present invention.

FIG. 1B shows a top view of the cooking utensil container of FIG. 1A.

FIG. 1C shows a top view of the receptacle part of the cooking utensil container of FIG. 1A with the insect guard removed from view.

FIG. 2A shows a side view of another example of an insect guard according to the present invention.

FIG. 2B shows a top view of the insect guard of FIG. 2A.

DETAILED DESCRIPTION

Figure 3:
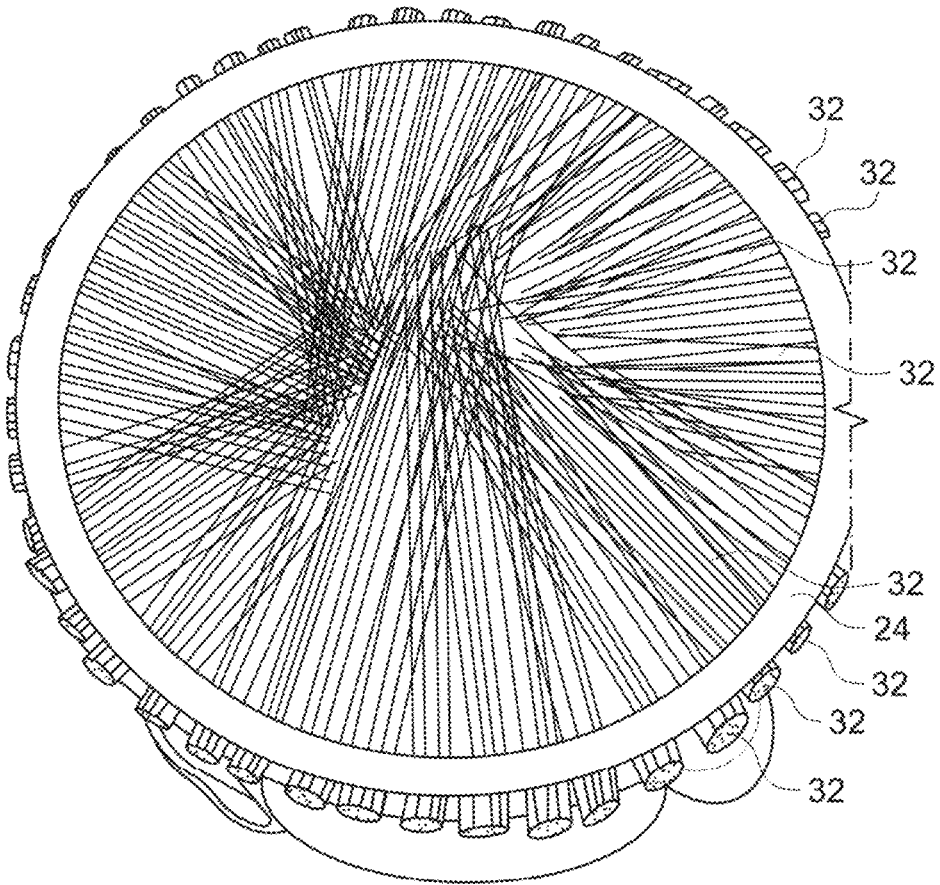
FIG. 3 is a top view of another example of an insect guard according to the present invention.

Referring to FIGS. 1A, 1B and 1C, a cooking utensil storage 10 according to the preferred embodiment includes a receptacle 12 and an insect guard 14.

In the preferred embodiment, the receptacle 12 may be a fluid-impermeable vessel having a bottom, base portion 16 and an enclosure wall 18 (for example, a cylindrical wall or a frustoconical wall) extending from the bottom portion 16 to define a storage space 28, the enclosure wall 18 terminating at an upper rim 20 that defines an open mouth 30 for the receptacle 12. The open mouth 30 may be at least five inches in diameter, and the enclosure wall 18 may be at least 10" high.

The insect guard 14 includes a plurality of bristles 22 that are supported by a support body defined by, for example, an endless wall 24 that surrounds a utensil reception and extraction space 26.

The bristles 22 are integrated with the endless wall 24 (for example, molded in, or glued to, the endless wall 24) and extend into the utensil reception and extraction space 26. Specifically, a proximal end of each bristle 22 is attached to or coupled with the endless wall 24 and the distal end of each bristle 22 extends into the utensil reception and extraction space 26 and remains free (i.e. unattached) to move freely.

Alternatively, both ends of the intermeshed bristles 22 may be integrated with the endless wall 24, while extending through the reception and extraction space 26 to create an insect barrier.

To permit movement, each bristle 22 may be made of a flexible body such as a plastic or metallic rod of a suitable cross-section.

According to the present invention, the number and arrangement of bristles 22 are such that the bristles 22 create a barrier (in the utensil reception and extraction space 26) to the entry of insects (in particular, flies) through the utensil reception and extraction space 26. Thus, for example, the bristles 22 may be long enough to intermesh with one another inside of the utensil reception and extraction space 26. On the other hand, due to their flexible nature and due to the fact that the distal ends of the bristles 22 are free to move, a cooking utensil may be at least partially received (inserted and extracted) through the utensil reception and extraction space 26. Thus, at least the portion of the utensil that is received through the utensil reception and extraction space 26 may be protected from insects by the bristles 22, which form an insect barrier inside of the utensil reception and extraction space 26.

As additional protection against insect contamination, the receptacle 12 which, in the preferred embodiment, is fluid-impermeable, may be filled with a fluid such as water that is, optionally, infused with a natural insect repellant such as lime or lemon (citrus) juice.

Advantageously, by inserting and extracting the utensil from the fluid-filled receptacle 12 through the bristles 22, dirt, grease etc. may be removed from the surface of the inserted portion of the utensil by the bristles 22. Furthermore, the fluid in the receptacle 12 provides weight that ensures stability of the utensil container 10 when a utensil is received in or extracted from the utensil container 10.

In the preferred embodiment, the interior space defined by the endless wall 24 is large enough to fit around the exterior surface of the receptacle 12 at the upper rim 20. The interior surface of the endless wall 24 may include a threaded section located below the utensil reception and extraction space 26, which threadably couples to a corresponding threaded section of the receptacle 12 located adjacent and below the upper rim 20, whereby the endless wall 24, and thus, the insect guard 14 may be selectively coupled to, and decoupled from, the receptacle 12 to create a barrier at the open mouth 30 of the receptacle 12 defined by the upper rim 20.

The endless wall 24 may be coupled to the receptacle 12 to create a barrier by any other suitable method such as snap coupling (fitting) or friction coupling instead of using threaded surfaces.

Moreover, in another variation shown in FIGS. 2A and 2B, the endless wall 24 may include a recess 34, whereby the narrower, lower portion of the endless wall 24 may be received interiorly of the receptacle 12, while the broader, upper portion thereof may rest on the upper rim 20 of the receptacle 12. The narrower, lower portion may have a threaded surface that threadably couples to a threaded interior surface of the receptacle below and adjacent the upper rim 20, may be snap coupled, friction coupled or engaged with the receptacle 12 in any other suitable way.

While coupling the receptacle 12 and the insect guard 14 is preferred for stability, it is not necessary. The insect guard 14 may simply sit on the upper rim 20 of the receptacle 12 to create a barrier. In this case, the insect guard 14 may be made to be heavy so that it is not moved easily when the utensil is extracted from the receptacle 12.

The receptacle 12 may be made of any suitable material such as plastic, glass, metal or wood. The receptacle 12 may be transparent, translucent or opaque.

While a fluid-impermeable container is preferred for the reasons stated herein, at least the enclosure wall 18 of the receptacle 12 may be made of netting or a mesh to prevent insect invasion when a utensil is received therein.

Referring to FIG. 3, in one particular embodiment, the bristles 22 may be grouped in bundles 32 and each bundle 32 is integrated with the endless wall 24 of the insect guard 14 by having its proximal end pass through the endless wall 24.

Figure 4:
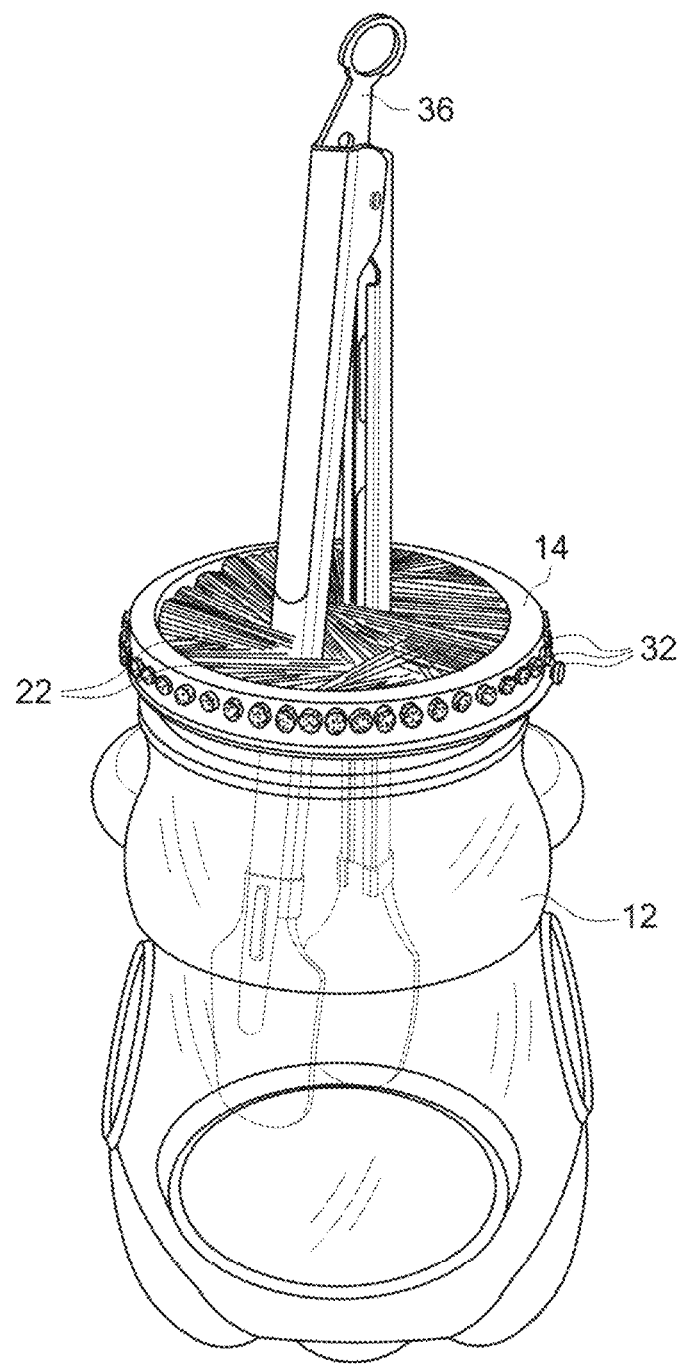
FIG. 4 shows a cooking utensil container according to the present invention with a utensil received therein and guarded by an insect guard according to the present invention.

FIG. 4 shows a cooking utensil 36 partially received in a water-filled receptacle 12 through the bristles 22 of the insect guard 14.

A lid or a cap of any suitable shape (e.g. dome shaped) may be provided to cover at least the reception and extraction space 26. The receptacle may be sized and shaped to be received in a hole defined, for example, in a countertop or an outdoor grill. Alternatively, the receptacle may have decorative features so that it may be displayed, for example, on a countertop in a kitchen.

A utensil container according to the present invention may be used in any place that prepares food such as a restaurant or a food truck.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cooking utensil storage, comprising:
    a container having a base and a wall, the wall extending from the base and terminating at an upper rim defining an open mouth; and
    an insect guard having a support surrounding a utensil reception and extraction space, and a plurality of flexible intermeshing bristles extending from the support into the utensil reception and extraction space, the intermeshing bristles being arranged to create an insect barrier at the open mouth and the intermeshing bristles being movable to permit at least a portion of a cooking utensil that touches food to pass through the intermeshing bristles while entering the container or being extracted from the container, wherein the intermeshing bristles create a barrier to entry of insects that surrounds a portion of the cooking utensil that has entered into the intermeshing bristles and received in the utensil reception and extraction space.

2. The cooking utensil storage of claim 1, wherein the container is a fluid impermeable vessel.

3. The cooking utensil storage of claim 1, wherein each bristle has an end connected to the support, and another free end inside of the utensil reception and extraction space.

4. The cooking utensil storage of claim 1, wherein the bristles are arranged in a plurality of bundles.

5. The cooking utensil storage of claim 1, wherein the support includes a wall configured to be coupled to and decoupled from the container, the bristles being connected to the wall.

6. The cooking utensil storage of claim 5, wherein the support wall and the container are threadably coupled.

7. The cooking utensil storage of claim 5, wherein the support wall is snap coupled to the container.

8. The cooking utensil storage of claim 5, wherein the support wall is friction coupled to the container.

9. The cooking utensil storage of claim 5, wherein the support wall includes a recess defining a narrow portion that is received in the container and a broader portion that rests on the upper rim of the container.

10. The cooking utensil storage of claim 5, wherein the support wall fits around an exterior surface of the container.

11. The cooking utensil storage of claim 1, further comprising a lid that covers the reception and extraction space.

12. A counter top or an outdoor grill having a hole that receives the container of the cooking utensil storage of claim 1.

13. An insect guard comprising:
    a support that is supportable at an upper rim defining an open mouth of a container that has a base and a wall, the wall extending from the base and terminating at the upper rim, the support surrounding a utensil reception and extraction space; and
    a plurality of flexible intermeshing bristles extending from the support into the utensil reception and extraction space, the intermeshing bristles being arranged to create an insect barrier at the open mouth and the intermeshing bristles being movable to permit at least a portion of a cooking utensil that touches food to pass through the intermeshing bristles while entering the container or being extracted from the container, wherein the intermeshing bristles create a barrier to entry of insects that surrounds a portion of the cooking utensil that has entered into the intermeshing bristles and received in the utensil reception and extraction space.

* * * * *